US012657575B2

(12) United States Patent
Kaplan et al.

(10) Patent No.: US 12,657,575 B2
(45) Date of Patent: Jun. 16, 2026

(54) NATIVE TOKEN BRIDGING

(71) Applicant: Ava Labs, Inc., New York, NY (US)

(72) Inventors: Michael Kaplan, New York, NY (US); Patrick Robert O'Grady, Palo Alto, CA (US); Stephen Buttolph, Brooklyn, NY (US); Aaron Buchwald, New York, NY (US); Bernard Wong, Waterloo (CA); Cameron John Schultz, Chicago, IL (US); Geoffrey Stuart, Toronto (CA); Matthew Lam, Brooklyn, NY (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 18/811,943

(22) Filed: Aug. 22, 2024

(65) Prior Publication Data

US 2025/0069064 A1    Feb. 27, 2025

Related U.S. Application Data

(60) Provisional application No. 63/534,778, filed on Aug. 25, 2023.

(51) Int. Cl.
*G06Q 20/38* (2012.01)
*G06Q 20/36* (2012.01)

(52) U.S. Cl.
CPC ....... *G06Q 20/3672* (2013.01); *G06Q 20/389* (2013.01)

(58) Field of Classification Search
None
See application file for complete search history.

(56) References Cited

U.S. PATENT DOCUMENTS 11,361,308 B1 *  6/2022  Gittleson ............... G06Q 20/02
11,477,005 B1 * 10/2022  Lupowitz ............. H04L 9/3213
(Continued)

OTHER PUBLICATIONS

Lohachab et al. "Towards Interconnected Blockchains: A Comprehensive Review of the Role of Interoperability among Disparate Blockchains." ACM Comput. Surv. Jun. 2021. https://doi.org/10.1145/3460287 (Year: 2021).*
(Continued)

*Primary Examiner* — Patrick Mcatee
*Assistant Examiner* — Christine Dang
(74) *Attorney, Agent, or Firm* — McDermott Will & Schulte LLP

(57) ABSTRACT

Various aspects of the subject technology relate to systems, methods, and machine-readable media for bridging native tokens. Various aspects may include initializing a first blockchain by allocating a plurality of native tokens. Aspects may also include transferring, using a bridge, one or more transactions from a second blockchain to the first blockchain using locked tokens on the second blockchain as collateral. Aspects may also include minting new native tokens at the first blockchain when a value of transactions sum to the plurality of native tokens and the plurality of native tokens are backed by the locked tokens. Aspects may also include reporting, to the second blockchain, the amount of tokens used for the transaction fees in the one or more transactions. Aspects may also include burning, at the second blockchain, tokens corresponding to the amount of tokens used for paying transaction fees.

20 Claims, 7 Drawing Sheets

(56)  References Cited

U.S. PATENT DOCUMENTS

| | | | |
|---|---|---|---|
| 2019/0172026 A1* | 6/2019 | Vessenes | G06Q 20/065 |
| 2019/0306235 A1* | 10/2019 | Veale | H04L 63/123 |
| 2020/0013045 A1* | 1/2020 | Spalding | G06Q 20/065 |
| 2021/0019737 A1* | 1/2021 | Vladi | G06Q 20/02 |
| 2021/0073913 A1* | 3/2021 | Ingargiola | G06F 16/2358 |
| 2022/0318796 A1* | 10/2022 | Zhou | G06Q 20/3827 |
| 2023/0020520 A1 | 1/2023 | Kaplan et al. | |
| 2023/0023993 A1* | 1/2023 | Kuchibotla | G06Q 20/381 |
| 2023/0222491 A1* | 7/2023 | Pacella | G06Q 20/06 |
| | | | 705/69 |
| 2023/0260037 A1* | 8/2023 | Mussallem | G06Q 20/389 |
| | | | 705/35 |
| 2023/0289791 A1* | 9/2023 | Zarick | G06Q 20/403 |
| 2024/0013195 A1* | 1/2024 | Osborn | G06Q 30/018 |
| 2024/0112155 A1* | 4/2024 | Song | G06Q 40/04 |
| 2024/0202679 A1* | 6/2024 | Mayerchak | H04L 9/50 |
| 2024/0320676 A1* | 9/2024 | Singh | G06Q 20/4016 |
| 2024/0330935 A1* | 10/2024 | Abdelrahman | G06Q 20/405 |

OTHER PUBLICATIONS

"The Evolution of Native Bridges," Li.Fi Knowledge Hub, Jul. 20, 2022 (Year: 2022).*

International Search Report and Written Opinion for International Patent App. No. PCT/US2024/043435, mailed Oct. 22, 2024 (15 pages).

* cited by examiner

400

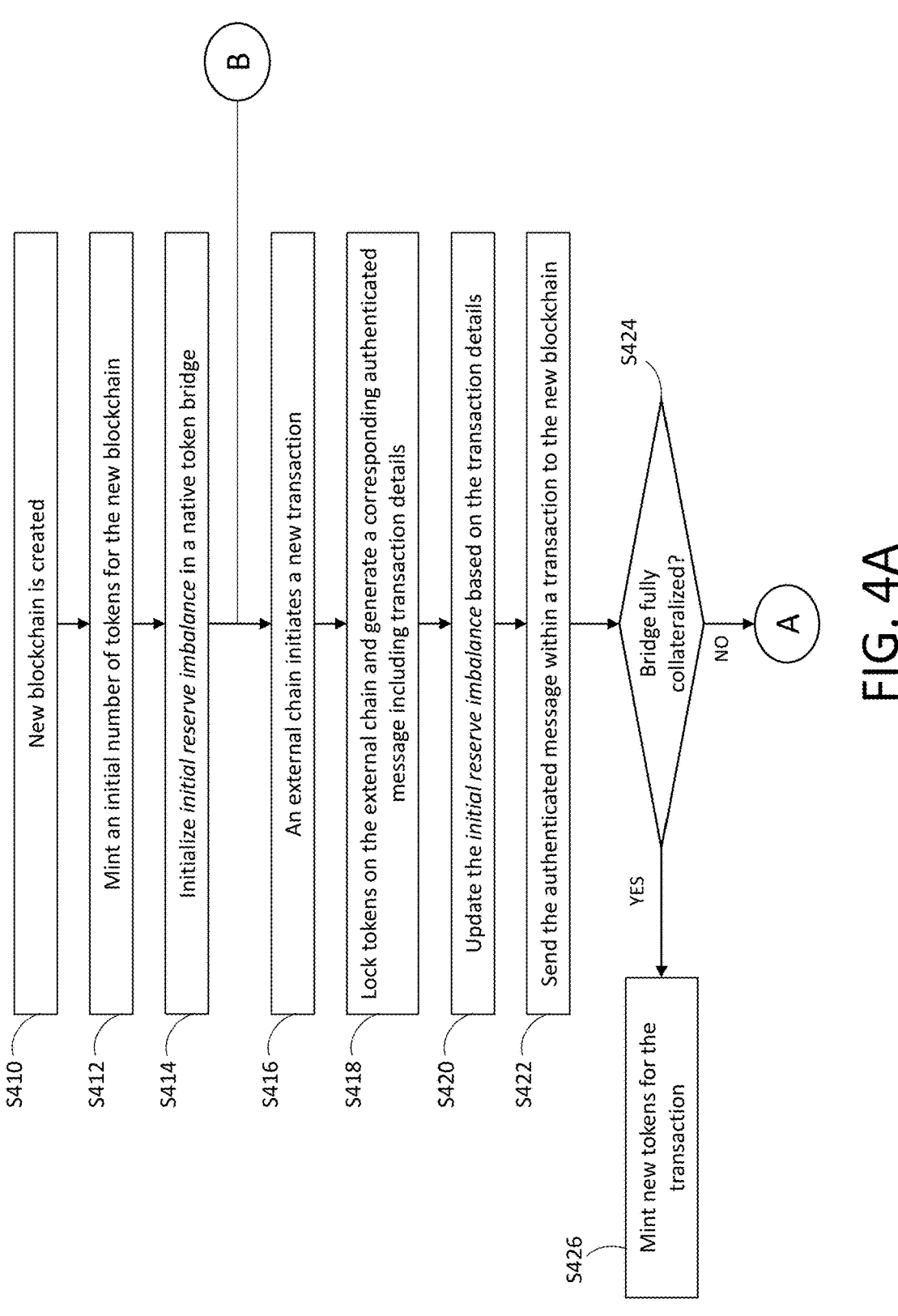

S410 — New blockchain is created

S412 — Mint an initial number of tokens for the new blockchain

S414 — Initialize *initial reserve imbalance* in a native token bridge

S416 — An external chain initiates a new transaction

S418 — Lock tokens on the external chain and generate a corresponding authenticated message including transaction details S420 — Update the *initial reserve imbalance* based on the transaction details S422 — Send the authenticated message within a transaction to the new blockchain S424 — Bridge fully collateralized?

YES

NO

S426 — Mint new tokens for the transaction

S428 — Initial number of tokens are backed by the locked tokens on the external chain S430 — Burn tokens spent on transaction fees S432 — Track a number of tokens burned in transaction fees S434 — Periodically report the number of tokens burned in transaction fees to the external chain S436 — Burn a corresponding amount of the locked tokens on the external chain based on the report

NATIVE TOKEN BRIDGING

CROSS-REFERENCE TO RELATED APPLICATIONS

The present disclosure is related and claims priority, under 35 U.S.C. § 119(e), to U.S. Provisional Patent Application No. 63/534,778, entitled NATIVE TOKEN BRIDGING, to Michael Kaplan et al., filed on Aug. 25, 2023, the contents of which are hereby incorporated by reference in their entirety, for all purposes.

TECHNICAL FIELD

The present disclosure generally relates to blockchain technology, and more specifically relates to cross-chain communication between different blockchain networks and/or blockchain platforms using a native token bridging solution. The native token bridging solution initializes new blockchains using collateral that the bridge accounts for at every bridge event (e.g., transaction of assets, tokens, information, etc.).

BACKGROUND

Native tokens are the foundational tokens of a cryptocurrency blockchain designed to function directly with the blockchain. Blockchains typically define their own native token which is used to make transactions (i.e., pay transaction fees) through the blockchain. Native tokens are often used to represent the value of a crypto ecosystem. Because native tokens are unique to a blockchain, it is difficult to bridge a token from one blockchain to another as the cryptocurrencies may be different. Users are unable to directly bridge into another blockchain or send transactions to access funds on the other blockchain once they are bridged. As such, liquidity of assets between blockchains with different native tokens are constrained, reducing interoperability in blockchain technology.

BRIEF SUMMARY

The subject disclosure provides for systems and methods for a native token bridging solution wherein an existing chain's token is the native asset of another chain. Using this bridging solution, new blockchain only needs to mint new native tokens when the native token bridge is fully collateralized. According to embodiments, a computer-implemented method for native token bridging is provided. The method includes initializing a first blockchain by allocating a plurality of native tokens. The method also includes transferring, using a bridge, one or more transactions from a second blockchain to the first blockchain. The method also includes determining a total value of the one or more transactions. The method also includes based on the total value of the one or more transactions summing to the plurality of native tokens, minting new native tokens at the first blockchain for subsequent transactions. The method also includes tracking an amount of tokens from the plurality of native tokens used for paying transaction fees associated with the one or more transactions. The method also includes reporting, to the second blockchain, the amount of tokens used for the transaction fees.

According to embodiments, a system is provided including a processor and a memory comprising instructions stored thereon, which when executed by the processor, cause the processor to perform a method for native token bridging.

The method includes initializing a first blockchain by allocating a plurality of native tokens. The method also includes transferring, using a bridge, one or more transactions from a second blockchain to the first blockchain. The method also includes determining a total value of the one or more transactions. The method also includes based on the total value of the one or more transactions summing to the plurality of native tokens, minting new native tokens at the first blockchain for subsequent transactions. The method also includes tracking an amount of tokens from the plurality of native tokens used for paying transaction fees associated with the one or more transactions. The method also includes reporting, to the second blockchain, the amount of tokens used for the transaction fees.

According to embodiments, a non-transitory computer-readable storage medium is provided including instructions (e.g., stored sequences of instructions) that, when executed by a processor, cause the processor to perform a method for native token bridging. The method includes initializing a first blockchain by allocating a plurality of native tokens. The method also includes transferring, using a bridge, one or more transactions from a second blockchain to the first blockchain. The method also includes determining a total value of the one or more transactions. The method also includes based on the total value of the one or more transactions summing to the plurality of native tokens, minting new native tokens at the first blockchain for subsequent transactions. The method also includes tracking an amount of tokens from the plurality of native tokens used for paying transaction fees associated with the one or more transactions. The method also includes reporting, to the second blockchain, the amount of tokens used for the transaction fees. The method also includes burning, at the second blockchain, tokens corresponding to the amount of tokens used for transaction fees.

These and other embodiments will become clear to one of ordinary skill in the art, in view of the following.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 4A-4B illustrate a workflow of a process for native token bridging, according to certain aspects of the present disclosure.

Figure 1:
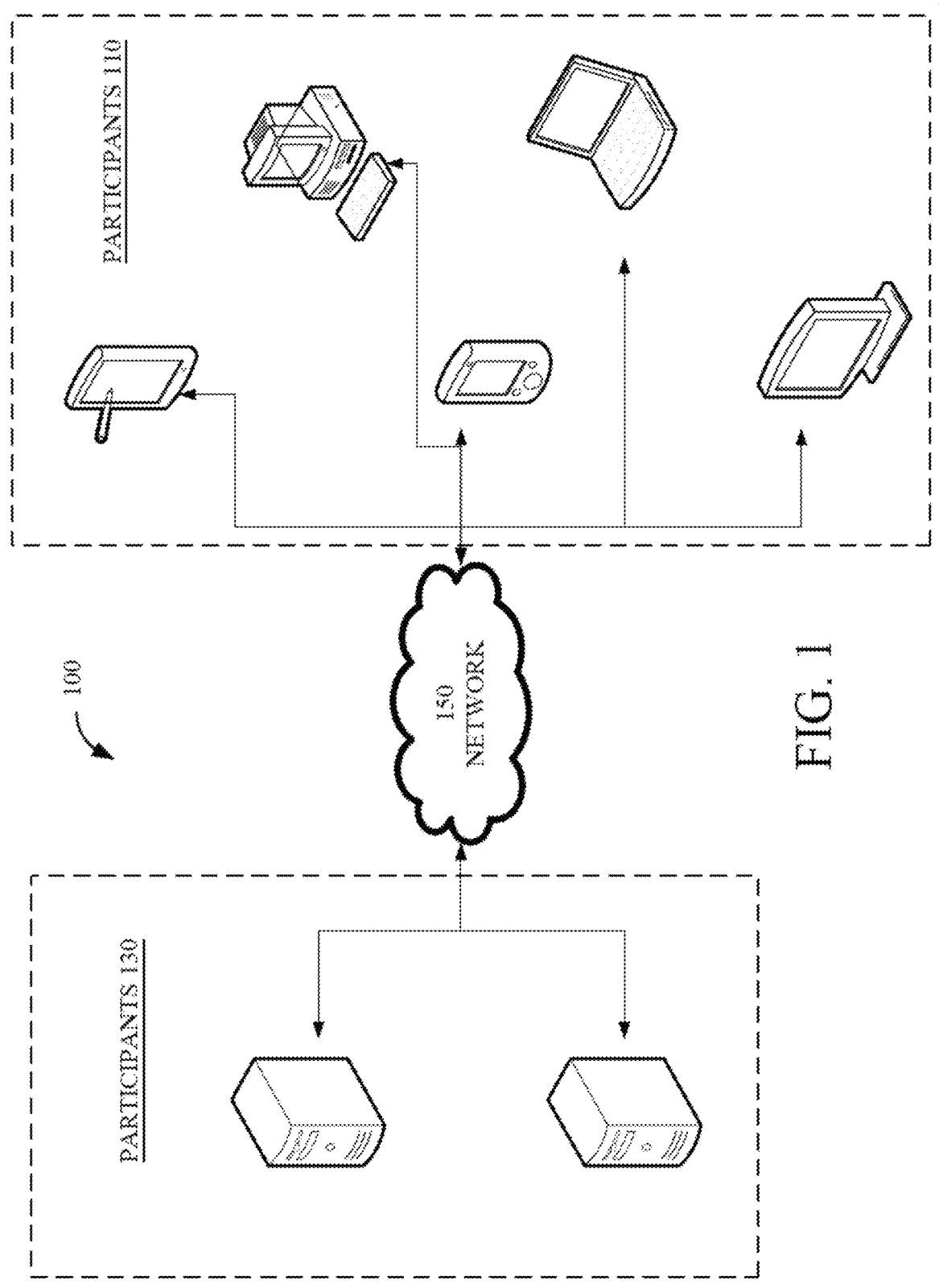
FIG. 1 illustrates an example blockchain system for a native token bridging solution, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

A blockchain is a database that maintains records for transactions and tracking of assets in blocks and/or tokens. A blockchain network includes nodes such as a validator node that participates in consensus. Validator nodes are capable of verifying, voting on, staking and/or maintaining a record of transactions for the blockchain network as well as storing a copy of the blockchain. Validators are also responsible for producing and/or proposing blocks for addition to, e.g., a same blockchain network. Validators can participate in protocols for implementation of blockchain deployments or building on subnets. A subnet is a dynamic set of validators working together to achieve consensus on the state of a set of blockchains. Each blockchain is validated by exactly one subnet. However, a subnet can validate many blockchains.

Conventional blockchain technology includes a growing list of records, called blocks, that are linked together using cryptography. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. As a distributed ledger technology, blockchain allows users to store and track digital transactions securely on a decentralized network without any centralized control or authority.

Native tokens are the foundational tokens of a cryptocurrency blockchain designed to function directly with the blockchain. Blockchains, when established, typically define their own native token which is used to make transactions (i.e., pay transaction fees) through the blockchain. Native tokens are often used to represent the value of a crypto ecosystem and used to pay transaction fees on the respective chain. As such, the native token is required in order to interact with the chain and a portion of the native token may be burned as part of each transaction. Because native tokens are unique to a blockchain, users are unable to directly bridge into another blockchain or send transactions to access funds on the other blockchains with different native tokens. Further, a bridge cannot mint native tokens of another blockchain to facilitate the transaction. As such, liquidity of assets between blockchains with different native tokens are constrained, reducing the interoperability of blockchain technology.

When an asset is bridged from one blockchain to another, the asset is locked on a source blockchain, and a message is relayed to the destination blockchain where a representative asset is minted. This results in a wrapped asset representation that is different from the native token of the destination chain. That is, for example, users are unable to directly bridge a token from a first blockchain to a second blockchain and directly end up with a native token of the second blockchain. This makes it difficult for users to move into new blockchains (e.g., the second blockchain) because they need to acquire some of the native token of the new blockchain elsewhere in order to be able to send transactions on that chain. This requires bridging other assets into the chain to move in liquidity. However, if the first blockchain does not have any of the second blockchain's native tokens, users cannot directly bridge into a new chain of the second blockchain because they would not be able to send transactions to access the funds on the new chain once they are bridged. Therefore, a new token needs to be created to launch a new chain because each chain needs to have its native token to pay for the transaction fees.

Further, when a new blockchain is created with a new native token, some amount of that native token is required in order to send transactions. This presents a bootstrapping issue that must be addressed before any transfer of tokens between the new blockchain and any existing blockchain.

The subject disclosure overcomes the above-described issue by providing a native token bridge that allows newly created blockchains (or newly launched chains in a subnet) to specify their native token as a pre-existing token on another blockchain. In this manner, users are able to bridge, swap, or transfer assets from an external blockchain into the newly created blockchain and send transactions on that newly created blockchain without having to acquire new native tokens of the newly created blockchain. The native token bridge can use the native token of any blockchain in a decentralized environment as the native token for another subnet. According to embodiments, new blockchains are bootstrapped with an initial unbacked allotment of native tokens in order to send the first few transactions, enabling the bridging of more tokens.

According to some embodiments, a new blockchain may be created. A new subnet of the new blockchain may specify to use an existing X token on an existing X chain as the new subnet's native token. Accordingly, users (of both the new and existing blockchains) are able to bridge/transfer their tokens (i.e., X token) from the chain (i.e., X chain) into the new subnet, as well as be able to send transactions on that new subnet.

According to some embodiments, to enable transactions with varying blockchains, the newly created blockchain (hereafter referred to as "new blockchain") is configured to mint more of its native token when tokens are bridged in from the external (existing) chain. The new blockchain is also configured to report back to the external chain. In some implementations, the report identifies to the external chain how much of the new blockchain's native token has been burned through use in transaction fees.

According to embodiments, the new blockchain is created with an initial allocation of tokens which are not backed by collateral on a source chain. The source chain is the external blockchain from which tokens are being transferred to the destination blockchain (i.e., the new blockchain). The initial allocation of tokens is needed in order for any transactions to be sent on the chain initially. On initialization, the native token bridge is uncollateralized by exactly the number of tokens minted in a genesis block on the destination chain and must be collateralized to enable burning/unlocking. To prevent tokens from being sent through the native token bridge with no corresponding tokens able to be unlocked on the source chain, the native token destination contract allocates a number of tokens in the genesis block of the destination chain and the bridge is initialized with an initial reserve imbalance value corresponding to the allocated number of tokens. The new blockchain is bootstrapped with an initial unbacked allotment of the native token in order to send the first few transactions. The native token destination contract will not mint tokens until at least the initialized value of tokens has been locked on the source chain. As such, burning/unlocking is disabled until the native token bridge is properly collateralized.

By non-limiting example, a new blockchain is created with an initial reserve imbalance of tokens in existence. The initial reserve imbalance is used to send transactions to deploy the native token destination contract. When a transaction is sent, a bridge transfer is initiated and tokens on the source chain are locked. A message is sent to the destination subnet indicating the locked amount. According to embodiments, new native tokens are only minted on the destination subnet when the native token bridge is fully collateralized. The bridge is fully collateralized when the initial reserve imbalance reaches zero. When the initial reserve imbalance value balances at zero, transfers may continue in both directions where the native token destination contract mints new native tokens on the destination subnet.

In some embodiments, the genesis block of the new chain may be used to specify an address that may contain a predetermined number of tokens. For example, when a new chain specifying the native token as X token from the X chain is started, the genesis block of the new chain can specify that one address holds ten X tokens (that are initially unbacked). That address will send the first few transactions completing bridge transfers that mint more X tokens. The first ten X tokens that are bridged in will not be minted; rather, they will account for the ten X tokens that were created in the genesis block.

In some embodiments, stablecoins (e.g., USDC, USDT) are used as the native token of the subnet (or new blockchain) and each token is backed by a reserve in the source chain as transactions are made. Transaction fees may also be paid in the stablecoin. The stablecoin may be issued on a designated chain (e.g., contract chain (C-chain)) of a blockchain network and would be bridged into the subnet using the native token bridge.

According to embodiments, tokens burned for transaction fees are reported back to the source chain. Traditionally, tokens are burned on the destination chain in order to redeem the collateral that was locked on the source chain. When tokens are burned as part of transaction fees within the destination subnet, they are no longer redeemable and able to be transferred back to the source chain because they were used for paying transaction fees and not to be moved back to the source chain. However, the collateral backing of those tokens is still held within the token source contract. In order to prevent the amount of unredeemable collateral held in token source contracts from continually growing over time, the collective amount burned as transaction fees within destination subnet may be reported back to the token source contract. The destination subnet can then burn the corresponding collateral.

According to embodiments, the amount burned as transaction fees may be tracked as the balance of the address (e.g., 0x0100 . . . 0) where transaction fees are credited to. No entity in the blockchain network controls that address. In order to differentiate the tokens burned by transaction fees from the amount of tokens burned by the native token destination contract when transferring tokens back to the source chain, tokens transferred back to the source chain are burned by sending them to another address (e.g., 0x0100 . . . 1).

Periodically reporting the amount of burn transaction fees back to the source chain can help mitigate the risk of theoretical subnet validator exploits by reducing the amount of collateral held on the source chain that should not be redeemable under any circumstances. According to some embodiments, the reporting is initiated on the destination chain by an individual sending a transaction on the destination chain. The transaction may result in a look up for how many tokens have been burned for transactions fees and reports that amount back in a message to the source chain. In some implementations, the amount of burn transaction fees is reported after very transaction, after a predetermined amount of time or number of transactions.

In some embodiments, entities of the blockchain network are incentivized to report the amount of burn transaction fees through rewards. In some implementations, a percentage of the burned amount is reminted, for example, on the destination subnet as the reward for actually performing the reporting of it. The transaction on the destination chain reporting the amount of burn transaction fees may indicate to the source chain an amount burned and an amount that can be released to a designated address as a reward for the reporting.

In some implementations, the native token bridge is configured to scale token amounts from one chain to another. Scaling may be applied when messages are received on the destination chain such that if one token X is bridged from the source chain, one native token Y is minted on the destination subnet. The scaling may be used to normalize the number of decimal places for tokens between two subnets. If a 1-to-1 relationship is desired, the scaling or decimal shift amount is set to zero. The scaling feature may be implemented using a multiplier, multiplying (or dividing) the number based on the decimal shift amount for the respective blockchains/subnets.

Embodiments may be implemented in chains of different blockchain platforms, as well as in all subnets of a blockchain platform and/or blockchains on different subnets. Embodiments may be implemented using messaging protocols that perform cross-chain messaging in a way such that the new blockchain can verify the locking of the tokens on the external chain occurred by verifying a signature directly from a validator set of the external chain. This approach does not require placing additional trust in additional elements, such as a bridge validator set. Accordingly, embodiments provide the advantage of allowing new chains to be created without needing to worry about the initial distribution of its native token.

In some implementations, the new blockchain must be as secure and decentralized as the external blockchain and bridging solution itself. For example, relying on a centralized bridging solution will result in a centralized new chain.

According to some embodiments, users who do not hold the native token of a new chain may be allowed to swap for the token and bridge it into the chain in a single transaction. In some embodiments, a single transaction may be allowed to swap for the token, bridge it into the new chain, and specify an arbitrary action (i.e., smart contract call for a smart contract stored on a blockchain) to make on the new chain. This way, users can make arbitrary interactions on the new chain by sending a single transaction on an external chain.

The disclosed system addresses a problem in blockchain technology tied to computer technology, namely, the technical problem of cross-blockchain network and/or blockchain platform communication. The disclosed system solves this technical problem by providing a solution also rooted in computer technology, namely, by providing for systems and methods for native token bridging in blockchain networks. The disclosed system also provides the advantage of allowing new chains to be created with an allotment of tokens upon initialization, thus eliminating the worry of needing to distribute its native token which users will need in order to be able to send transactions on the new chain. Embodiments also present burn transaction reporting which improves security of the blockchains and the transactions between them.

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a Merkle tree root hash.

As used herein, the term "subnet" or "subnetwork" generally refers to a dynamic set of validators working together to achieve consensus on a state of a set of blockchains. For example, each blockchain is validated by exactly one subnet. A subnet can validate arbitrarily many blockchains. A validator node may be a member of arbitrarily many subnets. A subnet may manage its own membership and it may require that its constituent validators have certain properties. Subnets are customizable and allow users to define their own rules for the blockchain. For example, subnets can easily enable native token bridging described herein, allowing native tokens to be minted by a smart contract.

Example Architecture

FIG. 1 illustrates an exemplary network architecture 100 to provide a blockchain platform (e.g., blockchain network implementation/deployment platform) for managing copyright risk, according to some embodiments. The blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example. The network architecture 100 of FIG. 1 includes one or more participants 110 (e.g., client device) and one or more participants 130 (e.g., server) which are communicatively coupled through the network 150.

The blockchain architecture of the network architecture 100 can be a distributed database that maintains a continuously growing list of ordered records as the blocks. The blockchain architecture may implement a messaging protocol designed to facilitate seamless communication between various chains, allowing for the transfer of data and value across different subnets using a native token bridge. Features of the blockchain network architecture 100 may improve cross-chain communication by bridging tokens between different chains without having to acquire new native tokens for newly created blockchains.

It is understood that the participants 130 may include the participants 110 as well, such that they are peers. For example, the participants 110/130 may be clients of the blockchain platform for creating, expanding, or otherwise modifying customized blockchain networks and/or private or public subnets. Participants 110 and participants 130 may initiate and send transactions amongst each other. In some embodiments, participants 110/130 may include a cloud server or a group of cloud servers. In some implementations, the participants 110/130 may not be cloud-based servers (i.e., may be implemented outside of a cloud computing environment) or may be partially cloud-based. As an example, the participants 110/130 may be different computers linked by the network 150 in a blockchain network having a same database including, but not limited to, a laptop computer, a desktop computer, or a mobile device such as a smart phone, a palm device, or a tablet device.

In some implementations, one or more of the participants 110/130 may be virtual machines (VMs) that form nodes of the blockchain network architecture 100. The participants 110 that function as nodes can run software to verify block and transaction data, store data, validate, respond to network requests for data, and/or the like for the existing blockchain. VMs can be computers that run on blockchain and allow smart contracts from multiple sources to interact with one another. In some implementations, participants 110 can send messages or issue transactions upon request by the participants 130, for example, at a particular time such as during a specified temporal submission window.

The network 150 may include a wired network (e.g., via fiber optic or copper wire, telephone lines, and the like) or wireless network (e.g., a cellular network, radio-frequency (RF) network, Wi-Fi, Bluetooth, and the like). The participants 110 may be any one of a mobile device, a laptop, a desktop, a tablet (e.g., palm or pad) device, a television, a display device, and/or the like. The participants 110 can be controlled by users as a set of validator nodes for making decisions in tandem, such as for facilitating operation or design of the blockchain implementations of the blockchain platform.

Multiple participants 110 may have access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices. The blockchain network architecture 100 will allow participants 110/130 to seamlessly transfer assets between chains.

The participants 130 may be virtual machines (VMs) running on a different blockchain platform from participants 110. The participants 130 may store data of the existing blockchain in a peer-to-peer (P2P) and/or distributed ledger fashion. In particular, the participants 130 may function in conjunction to autonomously manage the decentralized database(s) of the existing blockchain via the P2P network and a distributed timestamping server of the participants 130. The participants 130 may be configured to implement multiple chains of the blockchain network architecture 100. For example, the participants 130 can implement a plurality of chains of the blockchain network architecture 100, such as an asset blockchain (e.g., for creating new assets, asset exchange, and cross-subnet transfers), metadata blockchain (e.g., for coordinating validators, tracking active subnets, and creating new subnets), smart contract blockchain (e.g., for creating smart contracts and applications that require total ordering), etc.

A participant 110 and a server of one or more participants 130 of a computing network may access each other and other devices in the network 150 via corresponding communications modules. The communications modules may each include radio hardware and software such as RF antennas, analog circuitry, digital to analog conversion circuits, digital signal processing circuitry, and/or the like. Generally, the participant 110 and the participant 130 comprise computing devices including at least: a memory storing instructions and processors configured to execute the instructions to perform, at least partially, one or more steps as described in methods disclosed herein. The memory of participants 110 may be used to perform functions associated with the blockchain platform hosted by the participant 130. The processors may be used to operate the participant 110, such as to execute applications and functions thereof rendered on the participant 110. The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 2:
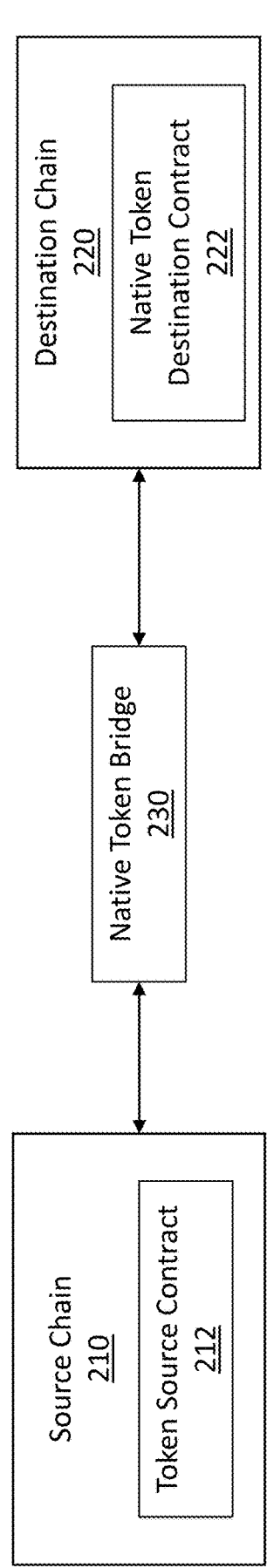
FIG. 2 is a block diagram of an example computing network for cross-chain communication using a native token bridging solution, according to certain aspects of the present disclosure.

FIG. 2 is a block diagram of an example blockchain network 200 in a blockchain platform for cross-chain communication using a native token bridging solution using a native token bridge, according to embodiments. The example blockchain network 200 may implement the native token bridging solution on any subnet or chain in a blockchain network, enabling both cross-chain and cross-subnet communication alike. FIG. 2 illustrates cross-chain communication but should be understood to include, for example, communication between a source chain and subnet.

As shown in FIG. 2, a native token bridge 230 may facilitate the transfer of tokens from a source chain 210 and a destination chain 220. The native token bridge 230 may be implemented using two primary contracts: the token source contract 212 and the native token destination contract 222. With the native token bridge 230, creating or buying new tokens in order to interact with new chains is not required for cross-chain transactions. Rather, subnets can use a token that is minted elsewhere (e.g., on any other subnet) to issue transactions.

The token source contract 212 exists on the source chain 210 and the native token destination contract 222 exists on the destination chain 220. A token source contract 212 may pair with one of the native token destination contracts (e.g., native token destination contract 222). The token source contract 212 may be configured to lock and unlock tokens on the source chain 210 corresponding to mints and burns on the destination chain 220. The native token destination contract 222 may be configured to mint and burn native tokens on the destination chain 220 corresponding to the locks and unlocks on the source chain 210.

According to some embodiments, the destination chain 220 may be a newly created blockchain launched on subnets. When the destination chain 220 is created, a corresponding native token is specified as any pre-existing token on another pre-existing blockchain. Accordingly, any participant can bridge/transfer their tokens from the pre-existing blockchain into the new subnet and can send transactions on the new subnet. By non-limiting example, USDC may be the native token on the source chain 210. The destination chain 220 may be a new subnet specifying that they want to use USDC as their native token. As such, using the native token bridging solution, tokens may be transferred between source chain 210 and destination chain 220 without needing to create new tokens.

According to embodiments, when the destination chain 220 is created, it is allocated an initial amount of the native token (e.g., USDC). This needs to be the case for any transactions to be sent on the destination chain 220 initially. The initial amount is assigned to addresses that will send initial transactions on the destination chain 220. The initial amount of the native token may be held in a first block or a genesis block on-chain. The initial amount of the native token is not yet backed by the token on the source chain 210.

According to embodiments, the native token bridge 230 sets a value for an initial reserve imbalance corresponding to the initial amount allotted when the destination chain 220 was created. The initial reserve imbalance is updated when bridging transactions from the source chain 210 to the destination chain 220 and collateralizes the native token bridge 230 based on each bridging event.

The source chain 210 may initiate a transaction. The transaction may be for a transfer of tokens and/or information. As part of the transaction process, token source contract 212 locks tokens on the source chain 210. An authenticated message is sent from the source chain 210 within the transaction, via the native token bridge 230, on the destination chain 220. The message indicates to the native token bridge 230 the amount that was locked on the source chain 210 and an address on the destination chain 220 the amount should be credited to. The native token bridge 230 updates the collateral represented by the value of the initial reserve imbalance based on the number of tokens detailed in the transaction and transaction fees associated with transferring the message.

The native token destination contract 222 receives and interprets the message from the token source contract 212 via the native token bridge 230. Based on the message, the native token destination contract 222 may mint the representative asset to the address on the destination chain 220 indicated in the message. Given the initial amount of native tokens allocated when the blockchain was created are available, the native token bridge 230 uses the initial amount of native tokens as collateral when moving tokens from the source chain 210 into the destination chain 220.

The native token destination contract 222 does not mint additional native tokens for the amount detailed in the message because it knows that tokens have been allocated. This accounts for the initial amount being minted in the genesis block prior to tokens being locked on the source chain 210 and ensures that the native tokens on new chains (e.g., destination chain 220) are backed by tokens on external chains (e.g., source chain 210) before minting new tokens. When the native token bridge 230 is fully collateralized (e.g., the collateral builds up until the initial reserve imbalance reaches zero), new funds can be minted for subsequent transactions. In some embodiments, a virtual machine of the destination chain 220 is implemented to mint more of the native token upon receiving a bridge event give the bridge is fully collateralized.

To move the tokens back to the source chain 210, they are burned on the destination chain 220 and an authenticated message is sent from the destination chain 220, via the native token bridge 230, to the source chain 210 to release the amount burned to a specified address (e.g., a burn address).

As transactions are sent on the destination chain 220, they each pay a transaction fee to prevent against Denial of Service (DoS) or spam attacks on the destination chain 220. The initial amount of the native tokens is used for paying the transactions fees. Tokens spent to pay for transaction fees are burnt on the destination chain 220, making them irredeemable. Therefore, they are not able to be moved back to the source chain 210. The destination chain 220 tracks the total amount of native tokens that have been burned in transaction fees.

According to embodiments, the destination chain 220 sends an authenticated message to the source chain 210 reporting the number of tokens that have been burned. The reporting may occur periodically (e.g., on a specified time interval or when the total burned token meets a specified threshold). The source chain 210 processes the message by burning the corresponding amount of the locked collateral backing the native token of the destination chain 220. This improves the security of the source chain 210 because the burned assets are unrecoverable even if the destination chain 220 validators or the native token bridge 230 were to be attacked or compromised in some way.

Figure 3:
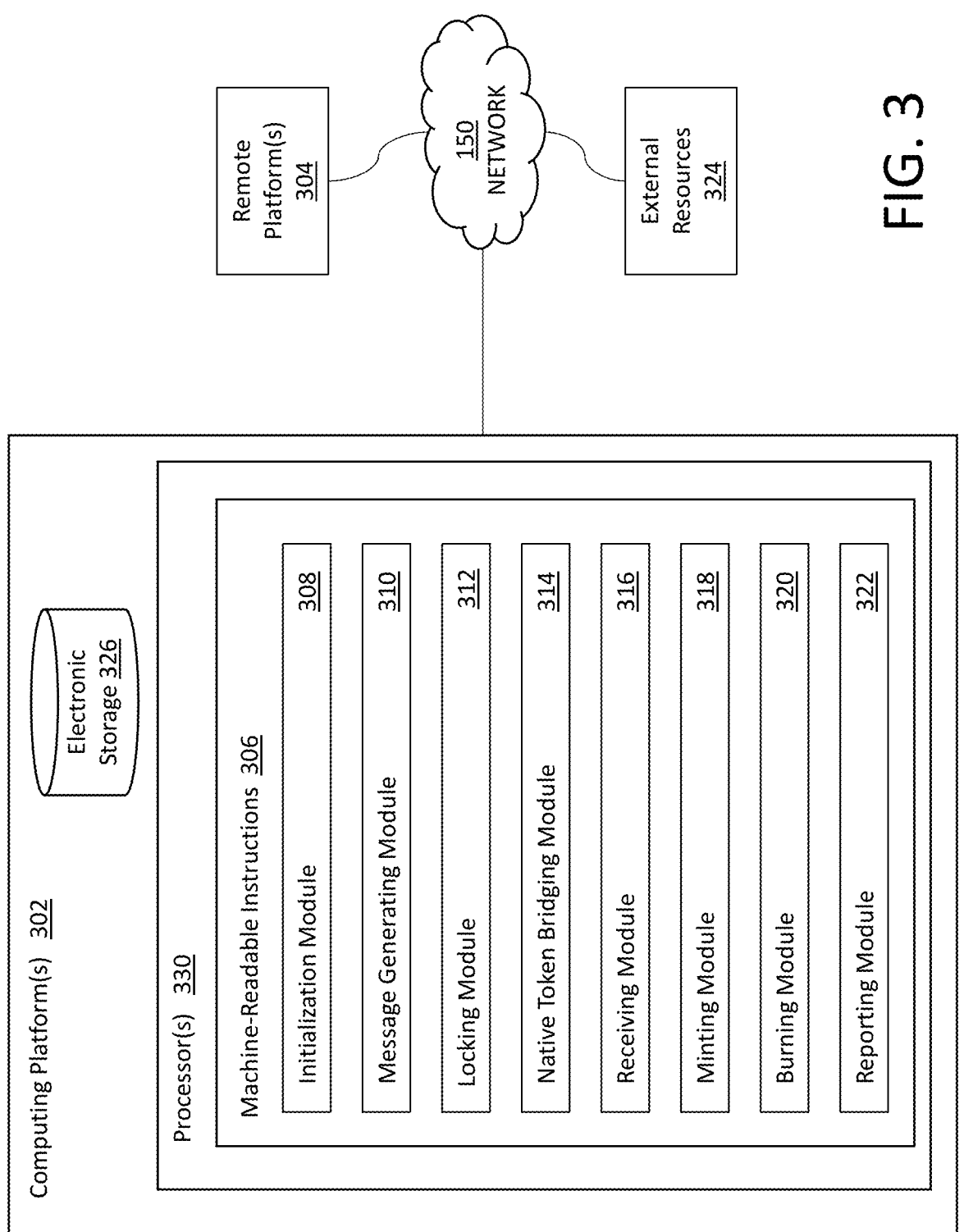
FIG. 3 is a block diagram illustrating a system configured for native token bridging, according to certain aspects of the present disclosure.

FIG. 3 is a block diagram illustrating a system 300 configured for native token bridging, according to one or more embodiments. The system 300 may be configured for cross-chain (or subnet) communication using native token bridging, according to certain aspects of the disclosure. The system 300 can be or include a blockchain system/platform for managing blockchains, each of which may be a linear chain of blocks such that each block has a parent block. In some implementations, the system 300 may include one or more computing platforms 302. The computing platform(s) 302 can correspond to a server component of the blockchain platform, which can be similar to or the same as the computing device(s) of participants 130 and include the client computing device(s) of participants 110 of FIG. 1. For example, the computing platform(s) 302 may be configured to initialize new blockchains, mint/burn tokens, and deliver messages from a source blockchain to a destination blockchain to facilitate the native token bridging.

Computing platform(s) 302 can be configured to implement messaging protocols enabling the transfer of messages from the client computing device(s). The computing platform(s) 302 may represent blockchain platforms (e.g., blockchain network 200). In some embodiments, the computing platform(s) 302 corresponds to creating or transferring tokens. The computing platform(s) 302 may be configured to communicate with one or more remote platforms 304 according to a client/server architecture, a peer-to-peer architecture, and/or other architectures. The remote platform(s) 304 may be configured to communicate with other remote platforms via computing platform(s) 302 and/or according to a client/server architecture, a peer-to-peer architecture, and/or other architectures. As an example, the remote platform(s) 304 can include relayers that determine which set of validator nodes are used to sign a message. The remote platform(s) 304 can be configured to cause output of the system 300 on client device(s) of the remote platform(s) 304 with enabled access (e.g., based on analysis by the computing platform(s) 302) according to stored data. The computing platform(s) 302, external resources 324, and remote platform(s) 304 may be in communication and/or mutually accessible via the network 150.

The computing platform(s) 302 may be configured by machine-readable instructions 306. The machine-readable instructions 306 may be executed by the computing platform(s) to implement one or more instruction modules. The instruction modules may include computer program modules. The instruction modules being implemented may include one or more of initialization module 308, message generating module 310, locking module 312, native token bridging module 314, receiving module 316, minting module 318, burning module 320, reporting module 322, and/or other instruction modules.

The initialization module 308 is configured to initialize new blockchains or subnets with their specified native token which are the same as another external chain. The initialization module 308 creates an initial amount of the native token in the genesis block of the new blockchain to enable the transfer of initial transactions. The initial amount will be used to send the initial transactions on the chain. The initial amount of the native token on the new blockchain is not yet backed by tokens on the external chain. Therefore, the bridging will be undercollateralized by exactly the number of tokens minted in the genesis block on the new blockchain.

The message generating module 310 is configured to generate a message corresponding to a transaction between the new blockchain and the external chain. The message may include a value of the transactions or transfer of tokens. Given the new blockchain contains a pre-allotted amount of the native token, new tokens do not need to be minted for transactions between the new blockchain and the external chain. The message is generated at the sending chain.

The locking module 312 is configured to lock and unlock tokens at the external chain. The message is generated at the sending chain by the message generating module 310. Based on the message, the locking module 312 may lock a corresponding value of tokens at the external chain.

The native token bridging module 314 is configured to receive and transmit messages for transactions between the new blockchain and the external chain. The native token bridging module 314 is responsible for initiating minting or unlocking on the new blockchain and the external chain based on the message received. Each transaction is associated with transaction fees. The initial amount of the native token in the genesis block of the new blockchain may be used to pay the transaction fees.

According to some embodiments, the system 300 may further be configured to scale token amounts sent to or from the external chain. In some embodiments, the scaling is performed when messages are received on the destination chain such that if one token X is bridged from the source chain, one native token Y is minted on the destination subnet. The scaling may be used to normalize the number of decimal places for tokens between two subnets. If a 1-to-1 relationship is desired, the scaling or decimal shift amount is set to zero. The scaling feature may be implemented using a multiplier, multiplying (or dividing) the number based on the decimal shift amount for the respective blockchains/subnets.

The receiving module 316 is configured to receive messages and interpret the messages for the purposes of minting or burning at the new blockchain. The receiving module 316 accounts for the initial amount of native tokens in the genesis block of the new blockchain in determining if new native tokens need to be minted for a given transaction. The receiving module 316 may determine if the tokens in the initial amount are backed by tokens on the external chain.

The minting module 318 is configured to mint new native tokens. Once the native token bridging module 314 transfers tokens into the new blockchain that sum up to the initial amount allotted by the initialization module 308, the minting module 318 is configured to mint additional native tokens on the new blockchain. If the initial amount allotted by the initialization module 308 is not fully backed by tokens on the external chain, the minting module 318 is configured to build up the collateral in accordance with the value of transactions. This process continues until the initial amount is fully collateralized. That is, collateral or locked tokens on the external chain accumulates to a balance equal to the initial amount of native tokens allocated at the new blockchain on initialization.

The burning module 320 is configured to burn tokens on the new blockchain to redeem collateral that was locked on the external chain. When the tokens are burned, the burning module 320 releases them to a specified address and sends a corresponding message to the external chain via the native token bridging module 314. The receiving module 316 may interpret the message generated in response to the burned tokens and trigger the locking module 312 to unlock the corresponding tokens in the external chain. The burning module 320 may burn tokens equal to the increase from a highest previously reported total from a destination chain (e.g., the new blockchain).

Based on the burned tokens at the new blockchain, the locking module 312 may be configured to unlock tokens corresponding to the burned tokens at the external chain. In this manner, the amount of collateral that had been previously locked on the external chain is released and sent to a recipient address on the external chain. The burning module 320 may be further configured to send the burned tokens to an inaccessible address (or burn address).

The reporting module 322 is configured to track the number of tokens that are burned for the purpose of paying transaction fees. The reporting module 322 is further configured to report the number back to the external chain. This ensures that the amount of collateral locked on the external chain is reduced accordingly for each transaction and tokens spent on transactions fees which are burned on the new blockchain are never redeemable by the external chain. According to some embodiments, the reporting module 322 determines a number of tokens at the burn address, generates a message containing the number of tokens at the burn address, and sends the message to the external chain.

In some implementations, the computing platform(s) 302, the remote platform(s) 304, and/or the external resources 324 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 302, the remote platform(s) 304, and/or the external resources 324 may be operatively linked via some other communication media.

A given remote platform 304 may include client computing devices, which may each include one or more processors configured to execute computer program modules. The computer program modules may be configured to enable an expert or user associated with the given remote platform 304 to interface with the system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms. The external resources 324 may include sources of information outside of the system 300, external entities participating with the system 300, and/or other resources. For example, the external resources 324 may include externally designed blockchain elements and/or applications designed by third parties. In some implementations, some or all of the functionality attributed herein to the external resources 324 may be provided by resources included in system 300.

Computing platform(s) 302 may include the electronic storage 326, processor(s) 330, and/or other components. The computing platform(s) 302 may include communication lines, or ports to enable the exchange of information with a network and/or other computing platforms. Illustration of the computing platform(s) 302 in FIG. 3 is not intended to be limiting. The computing platform(s) 302 may include a plurality of hardware, software, and/or firmware components operating together to provide the functionality attributed herein to the computing platform(s) 302. For example, the computing platform(s) 302 may be implemented by a cloud of computing platforms operating together as the computing platform(s) 302.

Electronic storage 326 may include non-transitory storage media that electronically stores information. The electronic storage media of the electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by the processor(s) 330, information received from computing platform(s) 302, information received from the remote platform(s) 304, and/or other information that enables the computing platform(s) 302 to function as described herein.

Processor(s) 330 may be configured to provide information processing capabilities in computing platform(s) 302. As such, processor(s) 330 may include one or more of a digital processor, an analog processor, a digital circuit designed to process information, an analog circuit designed to process information, a state machine, and/or other mechanisms for electronically processing information. Although processor(s) 330 is shown in FIG. 3 as a single entity, this is for illustrative purposes only. In some implementations, processor(s) 330 may include a plurality of processing units. These processing units may be physically located within the same device, or processor(s) 330 may represent processing functionality of a plurality of devices operating in coordination. Processor(s) 330 may be configured to execute modules 308, 310, 312, 314, 316, 318, 320, and/or 322, and/or other modules. Processor(s) 330 may be configured to execute modules 308, 310, 312, 314, 316, 318, 320, and/or 322, and/or other modules by software; hardware; firmware; some combination of software, hardware, and/or firmware; and/or other mechanisms for configuring processing capabilities on processor(s) 330. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in implementations in which processor(s) 330 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 330 may be configured to execute one or more additional modules that may perform some or all of the functionality attributed below to one of modules 308, 310, 312, 314, 316, 318, 320, and/or 322.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4B:
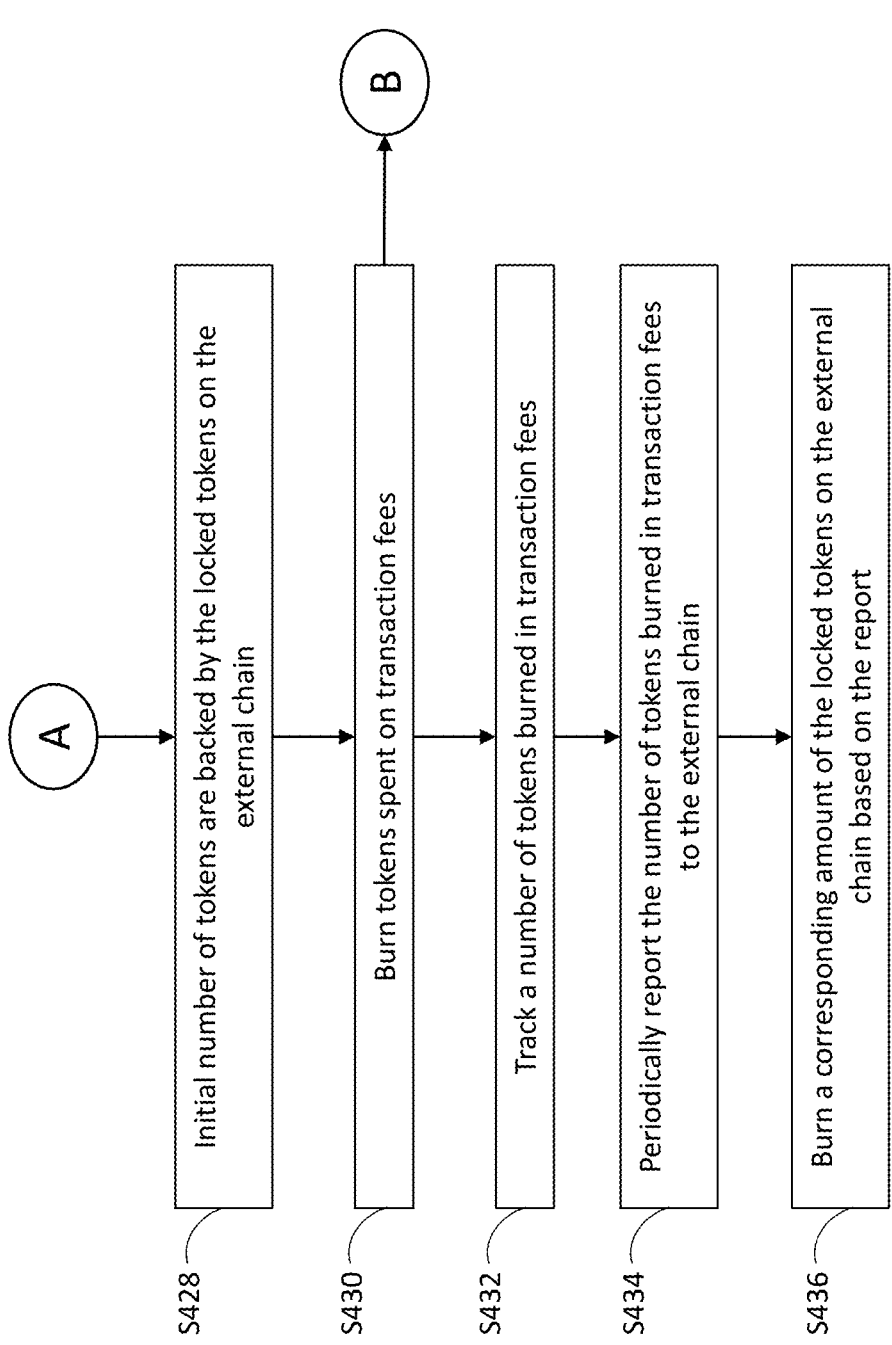

FIGS. 4A-4B illustrate a workflow of a process 400 for native token bridging, according to some embodiments. In some embodiments, one or more of the steps in process 400 may be performed by one or more of the modules 308, 310, 312, 314, 316, 318, 320, and/or 322. The process 400 describes an exemplary transaction involving, for example, the transfer of tokens from an external source chain to a new destination blockchain but is not limited to this. Embodiments may include transactions involving any cross-chain and/or subnet interactions.

As shown in FIG. 4A, at S410, a new blockchain is created. The new blockchain defines a specific token from another existing external chain as being its native token. In some implementations, the method includes identifying the new blockchain once it is created and determining the native token specified by the new blockchain.

At S412, based on the native token specified for the new blockchain, an initial number of tokens are minted for the new blockchain. The initial number of tokens are allocated to the new blockchain and will be used to send one or more initial transactions on the new blockchain.

At S414, an initial reserve imbalance is initialized in a native token bridge. The value of the initial reserve imbalance corresponds to the initial number of tokens allocated in the genesis block of the new blockchain. On initialization, the bridge is uncollateralized (represented by the initial reserve imbalance) by exactly the number of tokens minted and allotted to the new blockchain at S412. The initial number of tokens allotted for the new blockchain is not yet backed by tokens on the external chain. Bridge events (e.g., token transfers/transactions) will collateralize the bridge to account for the allotted amount.

At S416, a transaction is initiated on the external chain involving, for example, the transfer of tokens from the external chain to the new blockchain. At S418, tokens on the external chain are locked and an authenticated message including transaction details is generated. The transaction details may include at least, for example, the number of tokens locked on the external chain and transaction fees required to send the transaction to the new blockchain.

At S420, the bridge identifies the authenticated message and collateral of the bridge is built up by updating the initial reserve imbalance based on the transaction details. The initial reserve imbalance is therefore updated to account for the tokens locked on the external chain and the tokens required for transaction fees.

At S422, the bridge sends the authenticated message within a transaction to the new blockchain using a messaging solution. The bridge may implement the messaging solution for moving tokens for each transaction to/from the external chain and the new blockchain. In some implementations, the messaging solution is specified at the external chain and may include a messaging protocol used by entities of the blockchain network. The new blockchain receives the authenticated message and must determine whether to mint new tokens.

At S424, the process 400 includes determining if the bridge is fully collateralized based on the message and the initial reserve imbalance. The bridge is fully collateralized when the initial reserve imbalance becomes balanced, for example, by reaching zero. For the initial reserve imbalance to reach zero, bridge transfers must sum up to the initial amount of tokens allotted on the new blockchain and the initial number of tokens minted on the new blockchain (at S412). The bridge transfers include a number of tokens transferred and therefore locked on the external chain, as well as transaction fees associated with the transfers.

If the bridge is fully collateralized (YES at S424), the process 400 proceeds to S426 where the new blockchain mints new tokens for the transaction. Once the bridge is fully collateralized, the new blockchain will continue to mint tokens accordingly for subsequent transactions.

As shown in FIG. 4B, if the bridge is not fully collateralized (NO at S424), the process 400 proceeds to S428 where the allotted native tokens (i.e., initial number of tokens minted in S412) on the new blockchain are backed by the tokens locked on the external chain in association with the transaction. At S430, the tokens spent on transaction fees are burned at the new blockchain. According to embodiments, the process 400 may repeat S416-S424 for any new transactions initiated by the external chain.

At S432, the process 400 includes tracking the number of tokens burned on transaction fees at the new blockchain. At S434, the new blockchain periodically reports the number of tokens burned in transaction fees to the external chain. The reporting may occur periodically based on number of transactions, amount of tokens, at predetermined time periods, or the like. The bridge may facilitate the reporting in an authenticated message.

At S436, the external chain burns a corresponding amount of the locked tokens on the external chain based on the report. According to embodiments, the external chain receives a message from the new blockchain indicating the number of tokens burned on transaction fees (i.e., the report). The external chain may process the message by burning the corresponding amount of the locked tokens backing the initial amount of native tokens of the new chain. This ensures that tokens used to cover transaction fees cannot be released at the external chain.

Although FIG. 4 shows example blocks of the process 400, in some implementations, the process 400 may include additional blocks, fewer blocks, different blocks, or differently arranged blocks than those depicted in FIG. 4.

Figure 5:
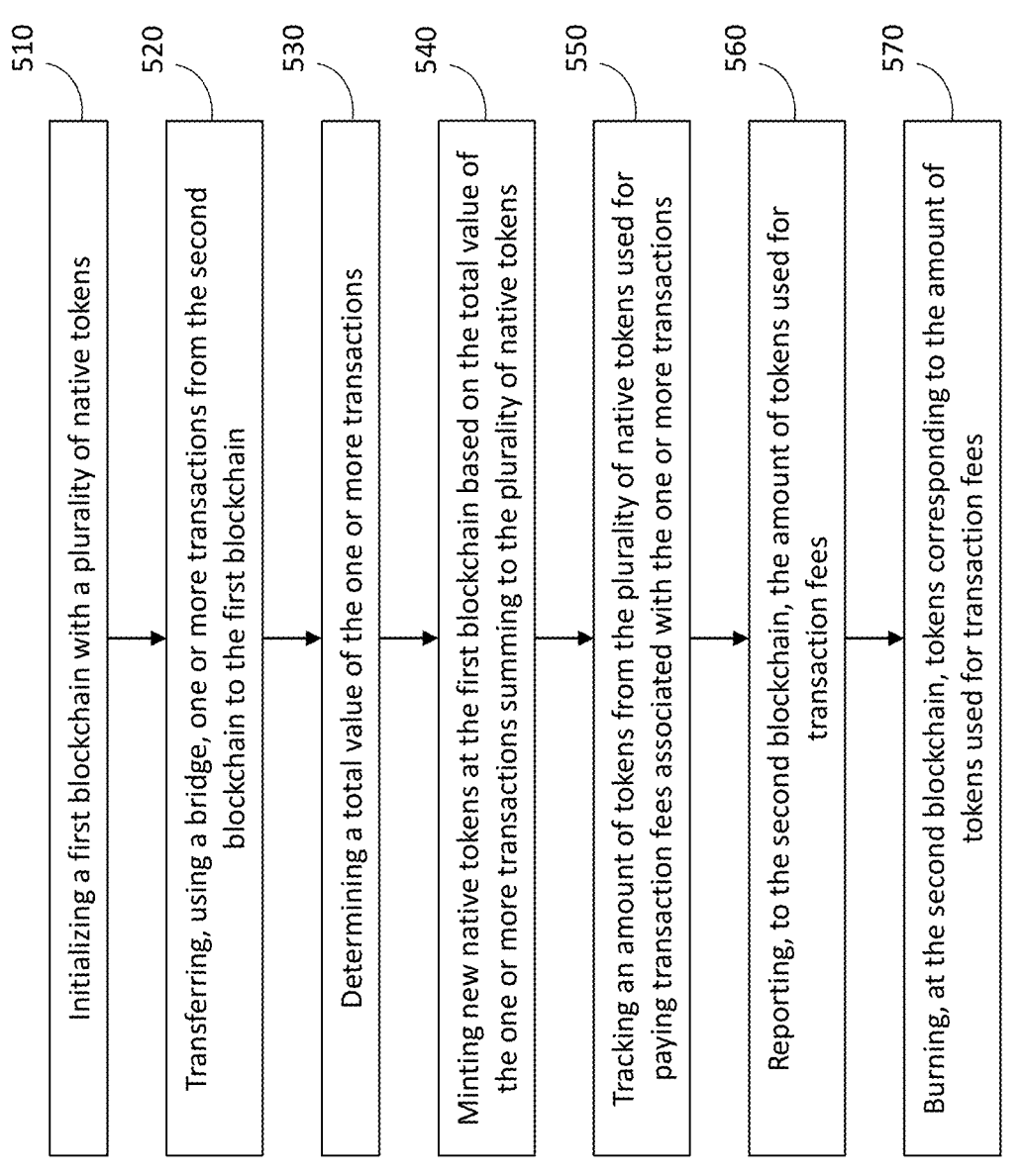
FIG. 5 illustrates an exemplary method for native token bridging, according to certain aspects of the present disclosure.

FIG. 5 illustrates a flowchart of a method 500 for native token bridging, according to some embodiments. The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In operation 510, the method 500 includes initializing a first blockchain with a plurality of native tokens. The first blockchain may correspond to a subnet or any newly created chain. The plurality of native tokens is allocated to the first blockchain and are unbacked by collateral. According to embodiments, the plurality of native tokens is used at the first blockchain to facilitate initial transactions on-chain.

According to embodiments, the native tokens of the first blockchain are defined at creation of the first blockchain. The native tokens may correspond to a specified native token from a second blockchain; therefore, the first and second blockchains may share the same native token. The plurality of native tokens is created and assigned to addresses that will send initial transactions on the first blockchain. The plurality of native tokens may be allotted in a genesis block in the first blockchain.

In some embodiments, the method 500 may include generating the first blockchain. The method 500 may further include minting the plurality of native tokens and initializing the first blockchain.

In some implementations, the plurality of native tokens may correspond to stablecoins.

In operation 520, the method 500 includes transferring, using a bridge, one or more transactions from the second blockchain to the first blockchain. Each transfer may include a token(s) and a transactions fee(s) associated with transferring the token(s). According to embodiments, transferring the one or more transactions may include locking source tokens in the second blockchain, generating authenticated messages corresponding to the one or more transactions indicating a number of locked source tokens on the second blockchain, and transferring, to the first blockchain, the authenticated message within the transactions.

In operation 530, the method 500 includes determining a total value of the one or more transactions. Depending on the total value of the transactions, the first blockchain may be configured to execute one or more operations.

In operation 540, the method 500 includes minting new native tokens at the first blockchain based on the total value of the one or more transactions summing to the plurality of native tokens. According to some embodiments, the total value of the one or more transactions exceeds the plurality of native tokens. In this instance, the method 500 may include backing all the plurality of native tokens and minting new native tokens corresponding to a surplus in the total value (i.e., tokens excess of the value of the plurality of native tokens allocated on the first blockchain).

According to embodiments, the total value of the one or more transactions sums to less than the plurality of native tokens. In this instance, the method 500 may include backing tokens from the plurality of native tokens in accordance with the value of the one or more transactions. Backing the native tokens will stabilize the first blockchain and collateralize the bridge by holding reserves on the second blockchain (i.e., tokens locked on the second chain). In some embodiments, the bridge may track the sum of each transaction and back the plurality of native tokens on the first blockchain with the tokens on the second blockchain based on each transaction. As such, collateral continues to grow until the value of the transactions account for all the allocated native tokens.

According to some embodiments, tokens transferred from the second blockchain to the first blockchain are scaled. For example, for a first token bridged from the second blockchain, a corresponding scaled second token is minted on the first blockchain.

In operation 550, the method 500 includes tracking an amount of tokens from the plurality of native tokens used for paying transaction fees associated with the one or more transactions. According to embodiments, the plurality of native tokens is used to cover token transfers (i.e., transactions) and pay the associated transaction fees.

In operation 560, the method 500 includes reporting, to the second blockchain, the amount of tokens used for transaction fees. According to some embodiments, the method 500 further includes incentivizing reporting the amount of burn transaction fees through rewards. In some implementations, a percentage of the burned amount is reminted, for example, on the first blockchain as reward for reporting the number of tokens used to pay for transaction fees.

In operation 570, the method 500 includes burning, at the second blockchain, tokens corresponding to the amount of tokens used for transaction fees. The second blockchain may receive a report (from operation 550) indicating the amount of tokens used for transaction fees and consequently burn the tokens based on the report.

According to some embodiments, transaction fees are credited to a designated address on the first blockchain. The second blockchain may track the amount of tokens used for transaction fees as the balance of the designated address. In embodiments, the tokens assigned to the designated address correspond to tokens burned as the transaction fees.

According to some embodiments, the method 500 may further include transferring tokens back from the first blockchain to the second blockchain. This may include burning tokens at the first blockchain and sending an authenticated message indicating to the second blockchain to release the amount of tokens burned at the first blockchain to a specified address.

In some implementations, one or more operation blocks of FIG. 5 may be performed by a processor circuit executing instructions stored in a memory circuit, in a client device, a remote server or a database, communicatively coupled through a network (e.g., processors 330, memories executing machine-readable instructions 306, participants 110/130, database, and network 150). In some implementations, one or more of the operations in method 500 may be performed by one or more of the modules 308, 310, 312, 314, 316, 318, 320, and 322. In some embodiments, methods consistent with the present disclosure may include at least one or more operations as in method 500 performed in a different order, simultaneously, quasi-simultaneously or overlapping in time.

Although FIG. 5 shows example blocks of the method 500, in some implementations, the method 500 may include additional blocks, fewer blocks, different blocks, or differently arranged blocks than those depicted in FIG. 5.

Hardware Overview

Figure 6:
FIG. 6 is a block diagram illustrating an example computer system (e.g., representing both client and server) with which aspects of the subject technology can be implemented.
Figure 6:
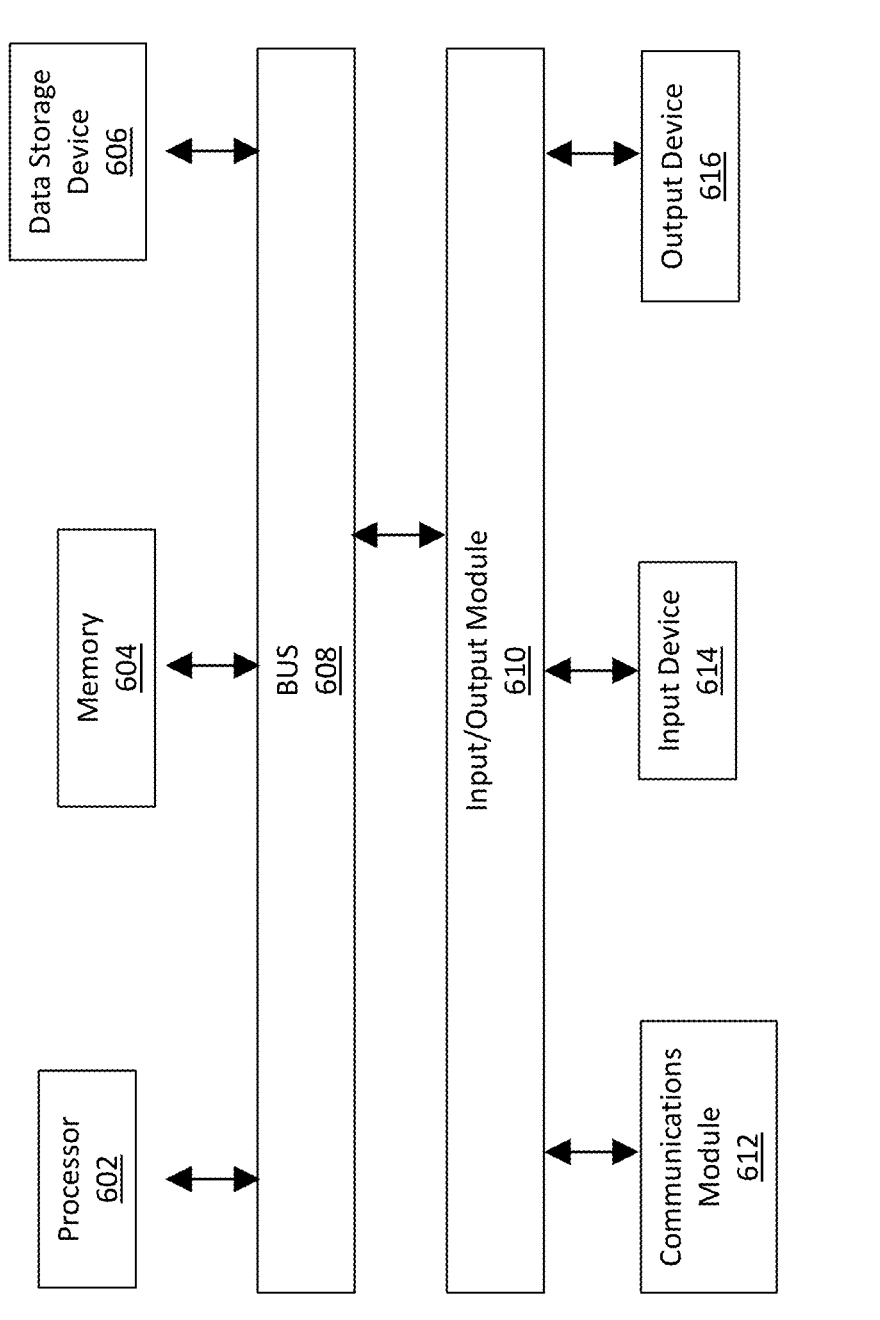

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

The computer system 600 (e.g., server and/or participant) includes a bus 608 or other communication mechanism for communicating information, and a processor 602 coupled with the bus 608 for processing information. By way of example, the computer system 600 may be implemented with one or more processors 602. Each of the one or more processors 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. Processor 602 and memory 604 can be supplemented by, or incorporated in, special purpose logic circuitry.

The instructions may be stored in memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by the processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 600 further includes a data storage device 606 such as a magnetic disk or optical disk, coupled to bus 608 for storing information and instructions. The computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described systems can be implemented using a computer system 600 in response to the processor 602 executing one or more sequences of one or more instructions contained in the memory 604. Such instructions may be read into memory 604 from another machine-readable medium, such as data storage device 606. Execution of the sequences of instructions contained in the main memory 604 causes the processor 602 to perform the process steps described herein. One or more processors in a multi-processing arrangement may also be employed to execute the sequences of instructions contained in the memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 600 can include clients and servers. A client and server are generally remote from each other and typically interact through a communication network. The relationship of client and server arises by virtue of computer programs running on the respective computers and having a client-server relationship to each other. The computer system 600 can be, for example, and without limitation, a desktop computer, laptop computer, or tablet computer. The computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 602 for execution. Such a medium may take many forms, including, but not limited to, non-volatile media, volatile media, and transmission media. Non-volatile media include, for example, optical or magnetic disks, such as the data storage device 606. Volatile media include dynamic memory, such as the memory 604. Transmission media include coaxial cables, copper wire, and fiber optics, including the wires that comprise the bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise"

as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method for bridging tokens, the method comprising:

initializing a first blockchain by allocating to the first blockchain a plurality of native tokens that are native tokens of a second blockchain;

maintaining, at a bridge, a reserve imbalance value corresponding to unbacked tokens in the plurality of native tokens;

receiving, at the bridge, a transfer request for one or more transactions for a transfer of assets from the second blockchain to the first blockchain;

in response to receiving the transfer request, locking a portion of the plurality of native tokens on the second blockchain to back the one or more transactions;

collateralizing the bridge using the locked portion of the plurality of native tokens for transactions on the first blockchain;

determining, at the bridge, a total value of the one or more transactions;

updating the reserve imbalance value in accordance with the total value of the one or more transactions, the reserve imbalance value representing collateralized backing that secures transactions executed on the first blockchain, wherein;

the total value summing to the reserve imbalance value indicates that the plurality of native tokens allocated to the first blockchain are backed by tokens on the second blockchain, and based on the total value summing to the reserve imbalance value, minting new native tokens at the first blockchain for subsequent transactions;

identifying, at the bridge, a first amount of tokens from the plurality of native tokens used for paying transaction fees for the one or more transactions; and reporting, to the second blockchain, the first amount of tokens used for the transaction fees.

2. The computer-implemented method of claim 1, wherein the plurality of native tokens on the first blockchain are defined at creation and correspond to native tokens on the second blockchain.

3. The computer-implemented method of claim 1, wherein the plurality of native tokens is allotted in a genesis block corresponding to a first block in the first blockchain.

4. The computer-implemented method of claim 1, wherein transferring tokens, using the bridge, through the one or more transactions from the second blockchain to the first blockchain further comprises:

locking, at the second blockchain, a second amount of tokens for the transactions, wherein at least a portion of the reserve imbalance value is collateralized in accordance with the second amount of tokens locked at the second blockchain;

generating, for each transaction, an authenticated message indicating the second amount of tokens locked on the second blockchain; and transferring, to the first blockchain, the authenticated message within the transaction.

5. The computer-implemented method of claim 1, further comprising, based on the total amount of tokens in the transactions being less than the reserve imbalance value, backing tokens from the plurality of native tokens in accordance with the total amount of tokens in the transactions.

6. The computer-implemented method of claim 1, further comprising, based on the total amount of tokens in the transactions exceeding the plurality of native tokens, backing the reserve imbalance value by the total amount of tokens, and minting new native tokens corresponding to a surplus in the total amount of tokens compared to the reserve imbalance value.

7. The computer-implemented method of claim 1, further comprising burning, at the second blockchain, tokens corresponding to the first amount of tokens from the plurality of native tokens used for paying the transaction fees on the first blockchain.

8. The computer-implemented method of claim 1, wherein the plurality of native tokens corresponds to stablecoins.

9. The computer-implemented method of claim 1, further comprising:

crediting the transaction fees to a designated address on the first blockchain; and tracking the first amount of tokens used for transaction fees as a balance of the designated address, wherein tokens assigned to the designated address correspond to tokens burned as the transaction fees.

10. The computer-implemented method of claim 1, further comprising scaling token amounts from the second blockchain to the first blockchain, wherein for a first token bridged from the second blockchain, a corresponding scaled second token is minted on the first blockchain.

11. A system for bridging tokens, comprising:

one or more processors; and a memory comprising instructions stored thereon, which when executed by the one or more processors, causes the one or more processors to:

initialize a first blockchain by allocating to the first blockchain a plurality of native tokens that are native tokens of a second blockchain;

maintain, at a bridge, a reserve imbalance value corresponding to the plurality of native tokens;

receive, at the bridge, a transfer request for one or more transactions for a transfer of assets from the second blockchain to the first blockchain;

in response to receiving the transfer request, lock a portion of the plurality of native tokens on the second blockchain to back the one or more transactions;

collateralize the bridge using the locked portion of the plurality of native tokens for transactions on the first blockchain;

determine, at the bridge, a total value of the one or more transactions;

update the reserve imbalance value in accordance with the total value of the one or more transactions, the reserve imbalance value representing collateralized backing that secures transactions executed on the first blockchain, wherein the total value summing to the reserve imbalance value indicates that the plurality of native tokens allocated to the first blockchain are backed by tokens on the second blockchain, and based on the total value summing to the reserve imbalance value, mint new native tokens at the first blockchain for subsequent transactions;

identify, at the bridge, a first amount of tokens from the plurality of native tokens used for paying transaction fees for the one or more transactions; and report, to the second blockchain, the first amount of tokens used for the transaction fees.

12. The system of claim 11, wherein the plurality of native tokens on the first blockchain are defined at creation and correspond to native tokens on the second blockchain.

13. The system of claim 11, wherein the plurality of native tokens is allotted in a genesis block corresponding to a first block in the first blockchain.

14. The system of claim 11, wherein the instructions, when executed by the one or more processors, cause the one or more processors to:

lock, at the second blockchain, a second amount of tokens for the transactions, wherein at least a portion of the reserve imbalance value is collateralized in accordance with the second amount of tokens locked at the second blockchain;

generate, for each transaction, an authenticated message indicating the second amount of tokens locked on the second blockchain; and transfer, to the first blockchain, the authenticated message within the transaction.

15. The system of claim 11, wherein the instructions, when executed by the one or more processors, cause the one or more processors to, based on the total amount of tokens in the transactions being less than the reserve imbalance value, back tokens from the plurality of native tokens in accordance with the total amount of tokens in the transactions.

16. The system of claim 11, wherein the instructions, when executed by the one or more processors, cause the one or more processors to, based on the total amount of tokens in the transactions exceeding the plurality of native tokens, back the reserve imbalance value by the total amount of tokens, and mint new native tokens corresponding to a surplus in the total amount of tokens compared to the reserve imbalance value.

17. The system of claim 11, wherein the instructions, when executed by the one or more processors, cause the one or more processors to burn, at the second blockchain, tokens corresponding to the first amount of tokens from the plurality of native tokens used for paying the transaction fees on the first blockchain.

18. The system of claim 11, further comprising stored sequences of instructions, which when executed by the one or more processors, cause the one or more processors to:

credit the transaction fees to a designated address on the first blockchain; and track the first amount of tokens used for transaction fees as a balance of the designated address, wherein tokens assigned to the designated address correspond to tokens burned as the transaction fees.

19. The system of claim 11, further comprising stored sequences of instructions, which when executed by the one or more processors, cause the one or more processors to scale token amounts from the second blockchain to the first blockchain, wherein for a first token bridged from the second blockchain, a corresponding scaled second token is minted on the first blockchain.

20. A non-transitory computer-readable storage medium comprising instructions stored thereon, which when executed by one or more processors, cause the one or more processors to perform operations for bridging tokens, comprising:

initializing a first blockchain by allocating to the first blockchain a plurality of native tokens that are native tokens of a second blockchain;

maintaining, at a bridge, a reserve imbalance value corresponding to the plurality of native tokens;

receiving, at the bridge, a transfer request for one or more transactions for a transfer of assets from the second blockchain to the first blockchain;

in response to receiving the transfer request, locking a portion of the plurality of native tokens on the second blockchain to back the one or more transactions;

collateralizing the bridge using the locked portion of the plurality of native tokens for transactions on the first blockchain;

determining, at the bridge, a total value of the one or more transactions;

updating the reserve imbalance value in accordance with the total value of the one or more transactions, the reserve imbalance value representing collateralized backing that secures transactions executed on the first blockchain, wherein the total value summing to the reserve imbalance value indicates that the plurality of native tokens allocated to the first blockchain are backed by tokens on the second blockchain, and based on the total value summing to the reserve imbalance value, minting new native tokens at the first blockchain for subsequent transactions;

identifying, at the bridge, a first amount of tokens from the plurality of native tokens used for paying transaction fees for the one or more transactions; and reporting, to the second blockchain, the first amount of tokens used for the transaction fees, wherein, tokens corresponding to the first amount of tokens used for transaction fees are burned at the second blockchain.

\* \* \* \* \*